United States Patent [19]

Sarullo

[11] Patent Number: 5,237,961

[45] Date of Patent: Aug. 24, 1993

[54] ARTICLE FOR ANIMALS

[76] Inventor: Salvatore Sarullo, 767 Hillwood Dr., Marietta, Ga. 30068

[21] Appl. No.: 846,703

[22] Filed: Mar. 6, 1992

[51] Int. Cl.5 .............................................. A01K 29/00
[52] U.S. Cl. .................................. 119/709; D30/160; 446/387; 433/1
[58] Field of Search ......................... 119/29, 295, 174; 54/66; 446/227, 268, 269, 272, 385, 491, 387, 369; 43/42.29; 15/215, 217, 235; D30/158, 160, 199; D21/154, 155, 156, 157-161, 163, 165, 186-188

[56] References Cited

U.S. PATENT DOCUMENTS

| | | | |
|---|---|---|---|
| 1,638,594 | 8/1927 | Myers | D21/161 X |
| 2,124,061 | 7/1938 | Gould | 15/235 |
| 2,920,411 | 1/1960 | Mitchell | 446/385 |
| 3,674,616 | 7/1972 | Howard | 446/321 X |
| 4,203,233 | 5/1980 | Crane | 446/369 |
| 4,535,725 | 8/1985 | Fisher | 119/29 |
| 4,695,496 | 9/1987 | Lee | 54/66 |
| 4,712,510 | 12/1987 | Tae-Ho | 119/29 |
| 4,770,123 | 9/1988 | Bell | 119/29 |
| 5,007,194 | 4/1991 | Coody | 43/42.29 |

OTHER PUBLICATIONS

"Bucko Mouse Cat Toy", *Ecco Bella*, Nov. 1990; p. 29.
"Buckle up Buddie TM ", Nov. 1986; 4 pages of promotional literature.

Primary Examiner—Robert P. Swiatek
Assistant Examiner—Todd E. Manahan
Attorney, Agent, or Firm—Michael V. Drew

[57] ABSTRACT

Sheep skin (12) with wool (14) attached, is cut into the shape of an animate object to form a toy-like article (10) for a pet or similar animal. The sheep skin (12) is decorated with features of the animate object, such as an eye (16), to help simulate the animate object. The animate objects simulated are objects which animals, such as canine and feline pets, are prone to chase, such as, a fish, cat, mouse or rabbit.

7 Claims, 5 Drawing Sheets

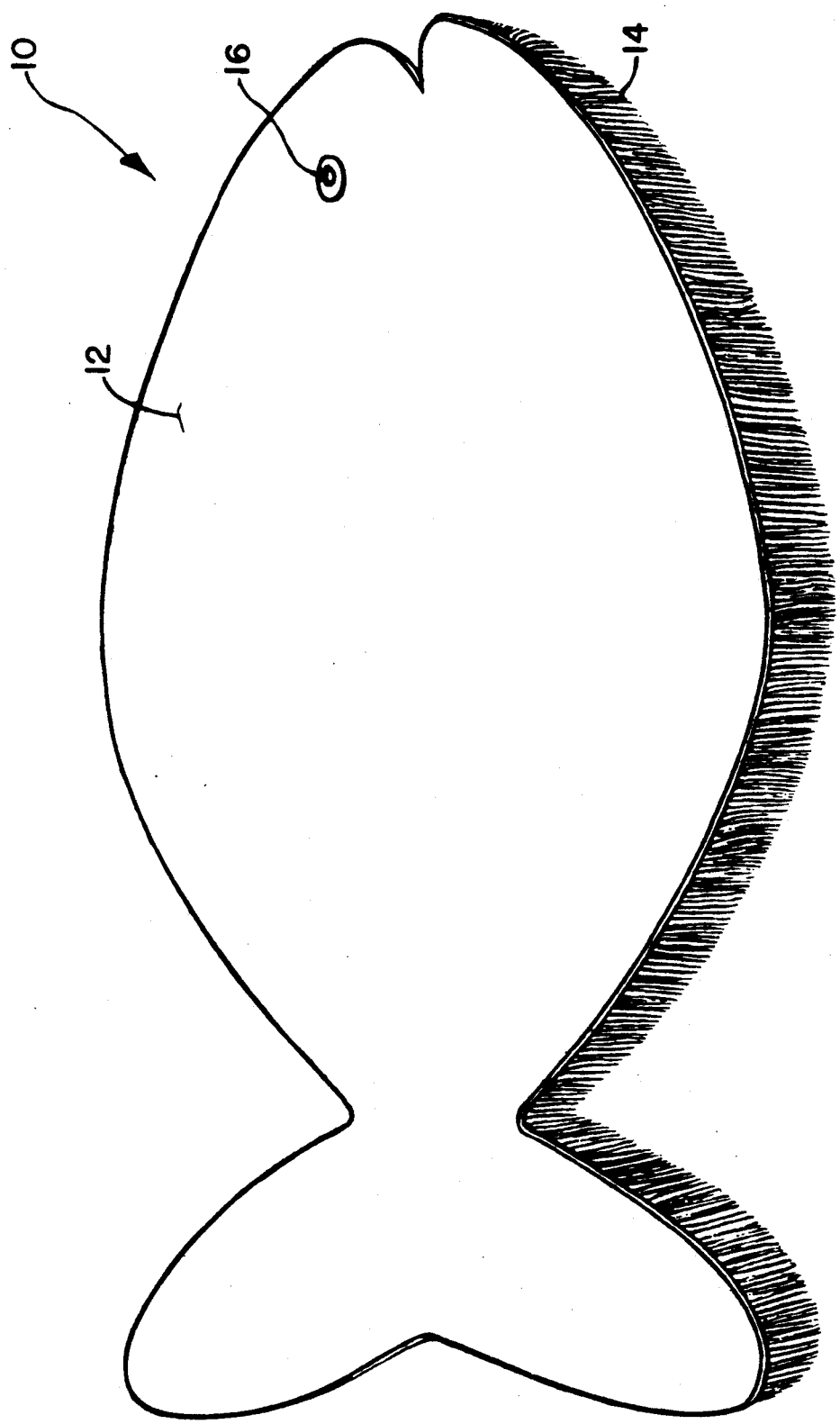

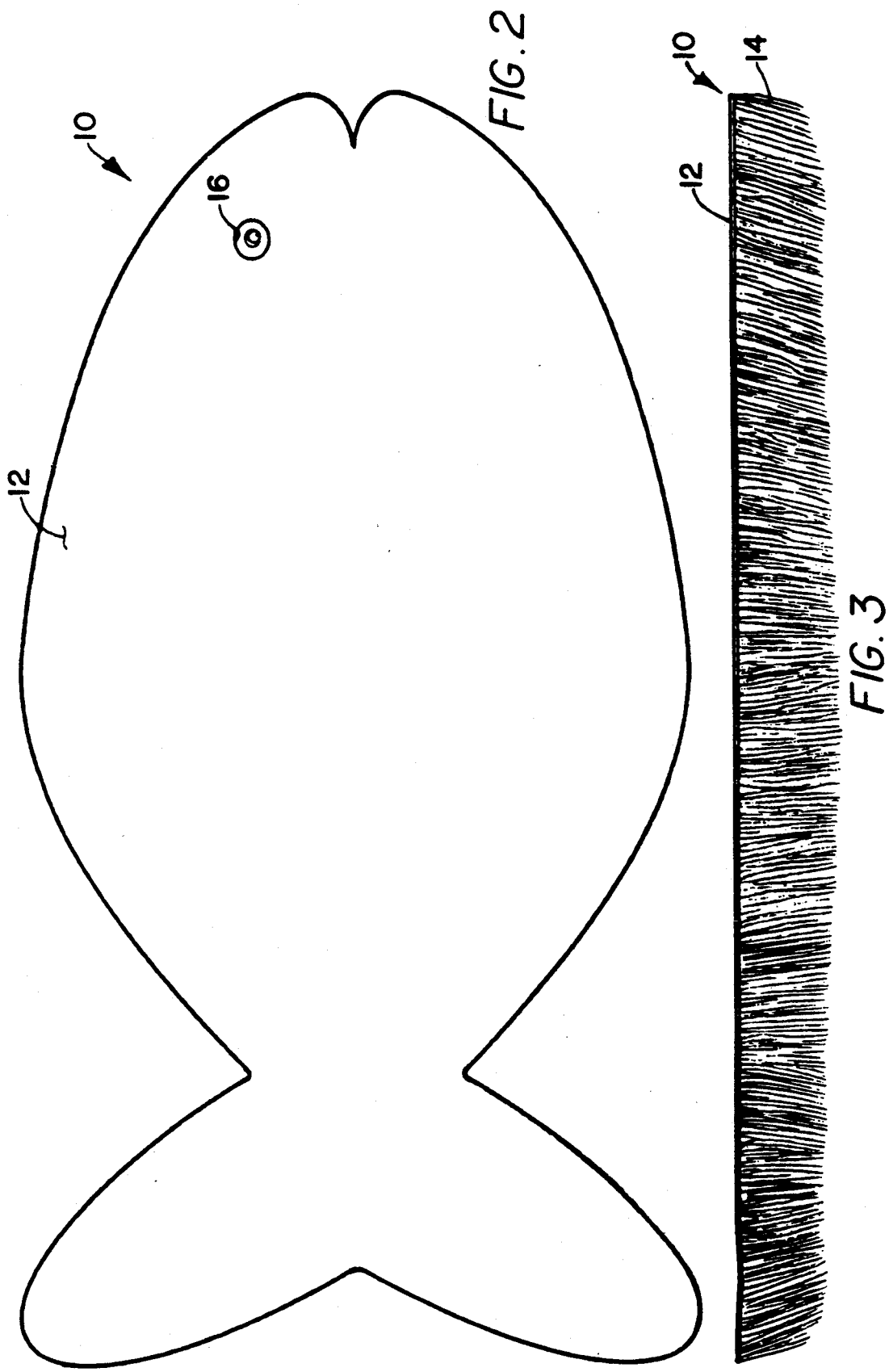

ARTICLE FOR ANIMALS

TECHNICAL FIELD OF THE INVENTION

The present invention relates to an article for animals, and more particularly to an article which provides amusement for, which is attractive to, which may be chewed upon by and which helps clean the teeth and stimulate gums of feline and canine animals such dogs, cats and the like.

BACKGROUND OF THE INVENTION

In keeping an animal such as a feline or canine it is important that the animal be entertained and cared for. Entertainment and grooming are independent objectives that are essential for the well-being of the animal but are difficult to achieve on a regular, continuing basis. An effective means of entertaining an animal is to provide a toy that the animal is attracted to so that the animal will play with the toy. This allows the animal to be stimulated both mentally and physically.

One of the grooming needs of an animal is the cleaning of teeth and the stimulation of gums. An effective means of cleaning an animal's teeth is for the animal to chew upon an object that removes harmful matter as the object rubs against the teeth and gums. It would be desirable to have a dependable means for entertaining an animal that is also a means for helping to clean the teeth of the animal.

SUMMARY OF THE INVENTION

It is an object of the invention to provide an article that will entertain an animal.

It is a further object of the invention to provide an article for entertaining an animal that is very attractive to the animal.

It is also an object of the invention to provide the above article which also helps to clean the teeth and stimulate the gums of an animal.

In the present invention, animal skin and fur, in particular, sheep skin with wool attached, is cut into the shape of an animate object and is decorated to simulate the animate object. The animate objects simulated are objects which animals such as canines and felines are prone to chase, namely, a fish, cat, mouse or rabbit.

Other aspects, objects, features, and advantages of the present invention will become apparent to those skilled in the art upon reading the detailed description of preferred embodiments.

BRIEF DESCRIPTION OF THE DRAWINGS

FIG. 1 is an isometric illustration of an article for an animal according to the present invention, simulating a fish.

FIG. 2 is a plan view of the invention of FIG. 1.

FIG. 3 is a side elevational view of the invention of FIG. 1.

DETAILED DESCRIPTION OF PREFERRED EMBODIMENTS OF THE INVENTION

Figure 4:
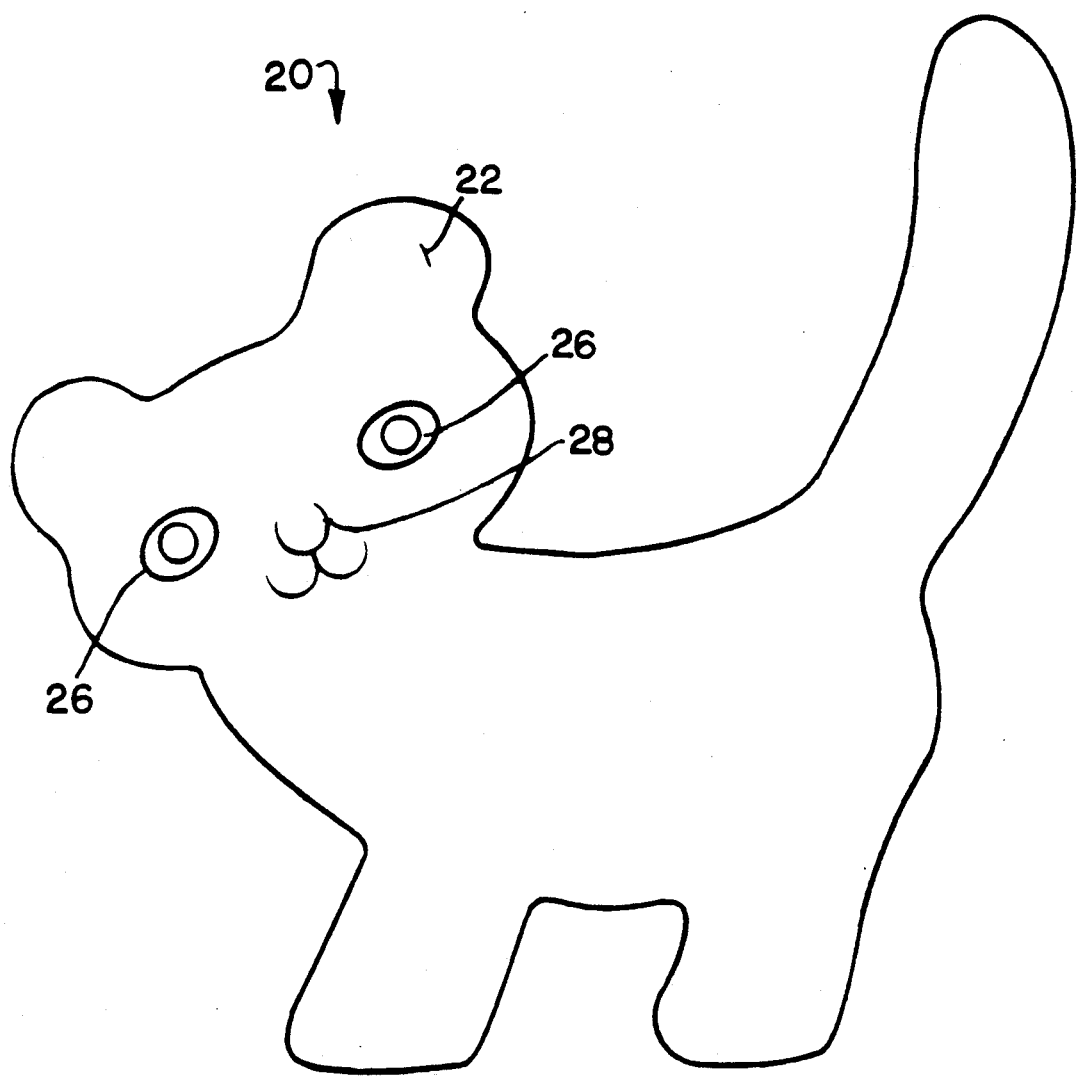
FIG. 4 is a plan view of an article for an animal according to the present invention, simulating a cat.

While the specification concludes with claims particularly pointing out and distinctly claiming the subject matter which is regarded as the present invention, the invention will now be described with reference to the following description of embodiments taken in conjunction with the accompanying drawings.

In a preferred embodiment of the invention animal skin and fur is cut into a shape simulative of an animate object which is attractive to an animal and decorated accordingly. Referring first to FIG. 1, therein is illustrated an article for an animal 10 according to a preferred embodiment of the invention. Even though each article 10, 20, 30, 40 referred to herein may also be considered a toy, they will primarily be referred to herein as an article because they do more than simply amuse and entertain. The articles 10, 20, 30, 40 also promote oral hygiene for the animal. The article 10 is shaped to simulate an animate object. The article 10 is made from animal skin and fur, and in the preferred embodiment is made from sheep skin 12 having sheep's wool 14 attached. Sheep skin 12 with wool 14 attached is generally referred to as sheepskin but is used herein as a disjointed word with a separate reference to the wool or fleece to avoid ambiguity. Sheep skin 12 and wool 14 is also meant to encompass lamb skin and wool. Sheep skin 12 with wool 14 attached is used for the article 10 because pets are attracted to the natural scent and feel of a real animal. Upon becoming attracted to the article 10 the animal will grasp the article 10 with its teeth and chew upon it, shake it, toss it about or otherwise play with it. The article 10 simulates the general appearance of an animate object which pets are prone to chase. The article 10 is cut into the general shape of the animate object, namely, another animal, such as a fish 12. Other shapes and simulations are illustrated by the articles 20, 30, 40 shown in respective FIGS. 4, 5, and 6, namely, a cat 12, a mouse 32 and a rabbit 42. Referring now again particularly to FIG. 1 and also to FIG. 2, in addition to being cut into the shape of a fish the sheep skin 12 is decorated to further simulate a fish by the addition of an eye 16 which may be painted on or firmly affixed as a separate element. Referring now to FIG. 3 in addition to FIG. 1, the sheep fur or wool 14 extends from the side of the sheep skin 12 opposite the decorated side.

Figure 5:
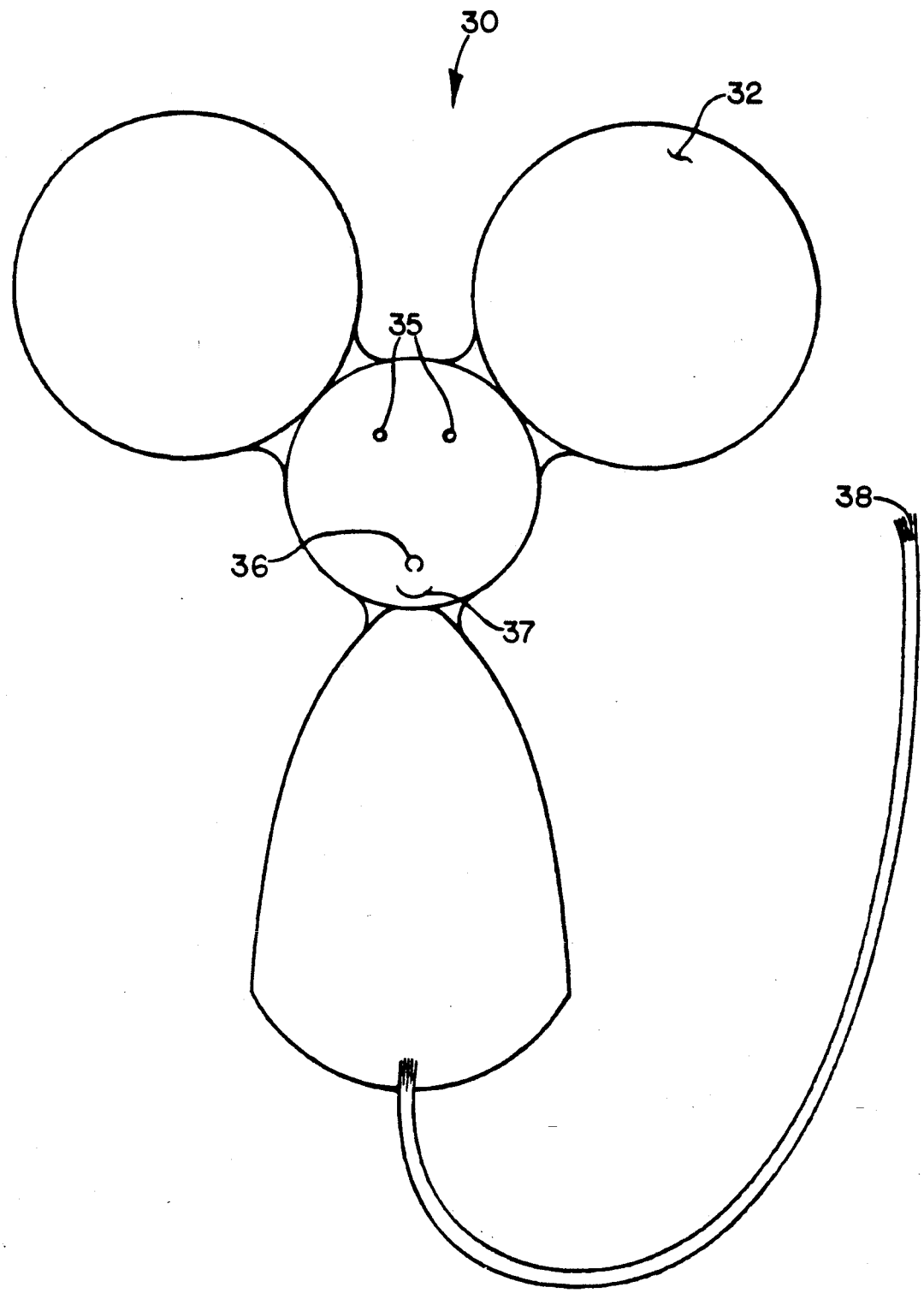
FIG. 5 is a plan view of an article for an animal according to the present invention, simulating a mouse.
Figure 6:
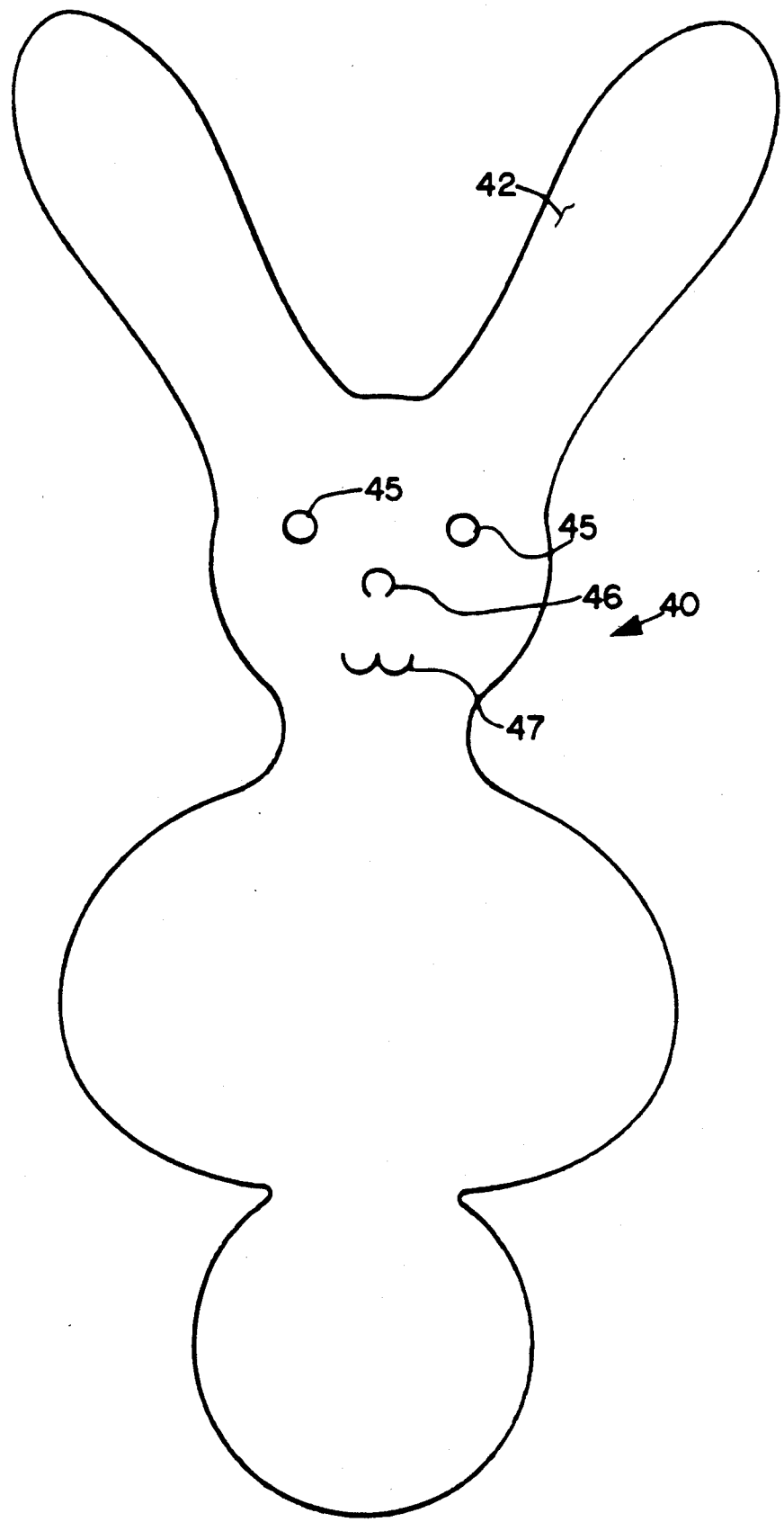
FIG. 6 is a plan view of an article for an animal according to the present invention, simulating a rabbit.

Referring now briefly to FIGS. 4, 5 and 6, the manner in which other respective toys/articles 20, 30, 40 are decorated is illustrated. In FIG. 4, the sheep skin 22 for the toy cat 20 is cut in the general shape of a cat and has other features, such as eyes 26 and a nose and mouth 28, marked upon or otherwise firmly attached to the sheep skin 22. In FIG. 5, the sheep skin 32 of the toy mouse 30 is generally cut in the shape of a mouse and as has other features including eyes 35, nose 36 and mouth 37 marked upon or otherwise firmly attached to the sheep skin 32. A tail 38 is attached to the sheep skin 32 body to further simulate the appearance of a mouse. The tail may be of the same sheep skin and fur material or may simply be rope or yarn. In FIG. 6, the sheep skin 42 of the toy rabbit 50 is generally cut in the shape of a rabbit and as has other features including eyes 46, a nose 46 and a mouth 47 marked upon or otherwise firmly attached to the sheep skin 42.

Pets and other animals are attracted to the toys/articles 10, 20, 30, 40 because of the scent and feel of the sheep skin and wool, as well as the appearance of the article in the form of an animate object which the pet or animal is prone to chase. As the pet plays with the article 10, 20, 30, 40, and grasps it in its teeth, the teeth are cleaned when the skin and wool are rubbed across them. The biting action upon the skin and wool also helps to massage and clean the gums of the pet. The depth, texture and thickness of the wool helps clean teeth as well as areas between teeth. The articles 10, 20, 30, 40 are completely washable and, thus, may be easily sanitized. The skin and wool are extremely durable and generally last longer than cotton or rawhide products subjected to biting by animals.

Although the invention has been described in the context of use by house pets the entertainment and oral-hygiene values described herein are beneficial to any animal which is attracted to the scent and feel of sheep skin and wool and the simulated appearance of an animate object. For example, the invention is applicable to animals maintained in zoos, such as the feline species including lions and tigers and their cubs. The invention is also applicable to canine species such as wolves and their cubs. The invention would also be useful for other animals, particularly carnivorous animals attracted to the scent and feel of sheep skin and wool and the simulated appearance of an animate object.

Although simulative markings for the invention have been illustrated as applied to the sheep skin it is also possible to apply simulative markings to the wool.

As should be apparent from the foregoing specification, the invention is susceptible of being modified with various alterations and modifications which may differ from those which have been described in the preceding specification and description. Accordingly, the following claims are intended to cover all alterations and modifications which do not depart from the spirit and scope of the invention.

What is claimed is:

1. An article for canines and felines consisting essentially of: sheep skin having wool extending from at least one surface thereof and cut into the shape of an animate object and having markings simulative of features of said animate object.

2. The invention of claim 1, wherein said animate object is from the group consisting of a fish, a cat, a mouse, and a rabbit.

3. An article for pet canines and felines consisting essentially of:
   sheep skin having a top surface and a bottom surface, cut into the shape of an animate object and having markings simulative of features of said animate object upon said top surface; and
   wool extending from said bottom surface.

4. The invention of claim 3, wherein said animate object is a fish.

5. The invention of claim 3, wherein said animate object is a cat.

6. The invention of claim 3, wherein said animate object is a mouse.

7. The invention of claim 3, wherein said animate object is a rabbit.

* * * * *